Dec. 16, 1941.  T. A. WETTIG  2,266,696

LATHE

Filed Dec. 11, 1940  5 Sheets-Sheet 1

INVENTOR.
Theodore A. Wettig
BY
Oliver B. Kaiser
ATTORNEY.

Dec. 16, 1941.                T. A. WETTIG                2,266,696
                                 LATHE
                          Filed Dec. 11, 1940          5 Sheets-Sheet 2

INVENTOR.
Theodore A. Wettig
BY Olivia B. Kaiser
ATTORNEY.

Dec. 16, 1941. T. A. WETTIG 2,266,696
LATHE
Filed Dec. 11, 1940 5 Sheets-Sheet 4

INVENTOR.
Theodore A. Wettig
BY Oliver B. Kaiser
ATTORNEY.

Dec. 16, 1941.    T. A. WETTIG    2,266,696
LATHE
Filed Dec. 11, 1940    5 Sheets-Sheet 5

INVENTOR.
Theodore A. Wettig
Oliver B. Kaiser
BY
ATTORNEY.

Patented Dec. 16, 1941

2,266,696

UNITED STATES PATENT OFFICE 2,266,696

LATHE

Theodore A. Wettig, Cincinnati, Ohio, assignor to The Acme Machine Tool Company, Cincinnati, Ohio, a corporation of Ohio Application December 11, 1940, Serial No. 369,646

12 Claims. (Cl. 82—29)

This invention relates to improvements in change speed gear transmission, primarily for machine tools and of the sliding or shiftable gear and clutch type, with the speed changes selectively effected in shifting the gears and clutches through the medium of electric motors, controlled by an electric circuit reversing and speed change indexing switch, manually pre-set, for automatically instituting a speed change upon bringing a driving power control lever to a neutral position, so that the shifting is accomplished when the gear driving power is cut off and the transmission is at rest.

An object of the invention is ot provide a change speed gear transmission with a plurality of gear trains between the driving and driven shafts, the trains for differential speed results, governed by shifting one or more gears thereof into and out of train, or connecting or disconnecting a driving connection therefor, the shifting accomplished by an electric motor moving in either of alternate directions and stalled while energized upon the shifter reaching the end of a shifting throw or stroke.

Another object of the invention is to provide a change speed gear transmission employing a shiftable three member compound gear for interposition in gear trains between the driving and driven shafts, shiftable to alternate positions by a reversible electric motor for independent intermesh with relative companion gears and to an intermediate gear intermeshing position by a second non-reversible electric motor, the motors stalled at their shiftable limits to the elimination of a motor stopping control.

Another object of the invention is to provide a speed change gear transmission employing one or more slidable gears or clutches for effecting variations in speed, the slidable members shifted by electric motors governed through an electric switch capable of being manually pre-set and controlled upon bringing a mechanical driving power clutch control lever to a neutral position.

Another object of the invention is to provide a speed change gear transmission employing sliding gears or members for effecting a speed change, shiftable by electric motors in electric circuit connection with a speed change indexing and selecting electric switch, capable of being pre-set and in circuit connection with an electric current controlling switch actuated by a power driving control lever when in neutral position, so that the speed change can only be administered when the transmission is at rest.

Another object of the invention is to provide a change speed gear transmission with a driving power control lever movable in alternate directions for a forward and reverse driving power direction control, the lever adaptable in an intermediate or neutral position to be shiftable transverse to the direction of power control shift and alternately, in one direction for the control of a brake mechanism for the transmission, and in a second direction for effecting an electric circuit for a change in the transmission gear setting for a variation in speed.

Another object is to provide a speed change transmission having an improved, simplified lever arrangement for convenient control thereof, consisting of an indexing speed change selector lever and a power and direction control lever, the latter capable of horizontal movement for reversing direction drive control, and transverse movement for alternately energizing a normally deenergized electric circuit to institute a selected gear change or to apply a brake, the lever locked against relative lateral movement, excepting in an intermediate or neutral position.

It is another object to provide a speed change gear transmission incorporating a plurality of multi-gear units, shiftable in several positions for meshing a gear of each unit with a respective companion gear as a member of a driving train between the drive shaft and the driven shaft, the shifting controlled by a manually operated indexing selector switch operable to shift the appropriate gear units either singly or in combination to attain a variation in speed, corresponding to the indexed position of the selector switch.

Another object is to provide a power controlled speed change gear transmission having a selector lever and a main power and direction control lever, the selector lever capable of being pre-set for a speed change while the machine is in operation, the setting ineffective until the main control lever is moved to a stopping position.

Another object is to provide a power controlled variable speed gear transmission having a selector lever and a main power and direction control lever, the selector lever capable of being pre-set to selectively shift one or several speed change gears for a variation in speed when the main lever is moved to an intermediate stopping position, the mechanism provided with signal means operative during shifting to signify the completion of the gear shift.

Further objects and advantages of the invention will be more fully apparent from a description of the accompanying drawings, in which.

For the purpose of exemplification, the improved change speed gear transmission is illustrated as organized within a headstock of an engine lathe or machine tool for a variable speed drive for a work holding spindle as the driven element or shaft of the transmission unit. The arrangement of gearing between the driving and the driven shaft or spindle as selected provides for a range of twelve changes of speed in either of alternate forward and reverse directions. The changes in speed are selectively controlled by a single control lever having a definitely indexed position for each change capable of being preset and effective only when a power or drive controlling lever is in a neutral position. The speed selector embodies an electrical control system for operating a plurality of electric motors, and for the change speed results in the present instance, comprise four motors as the means for shifting the gears or clutches, selectively energized through an electric circuit controlling switch operated by said single control lever.

Figure 2:
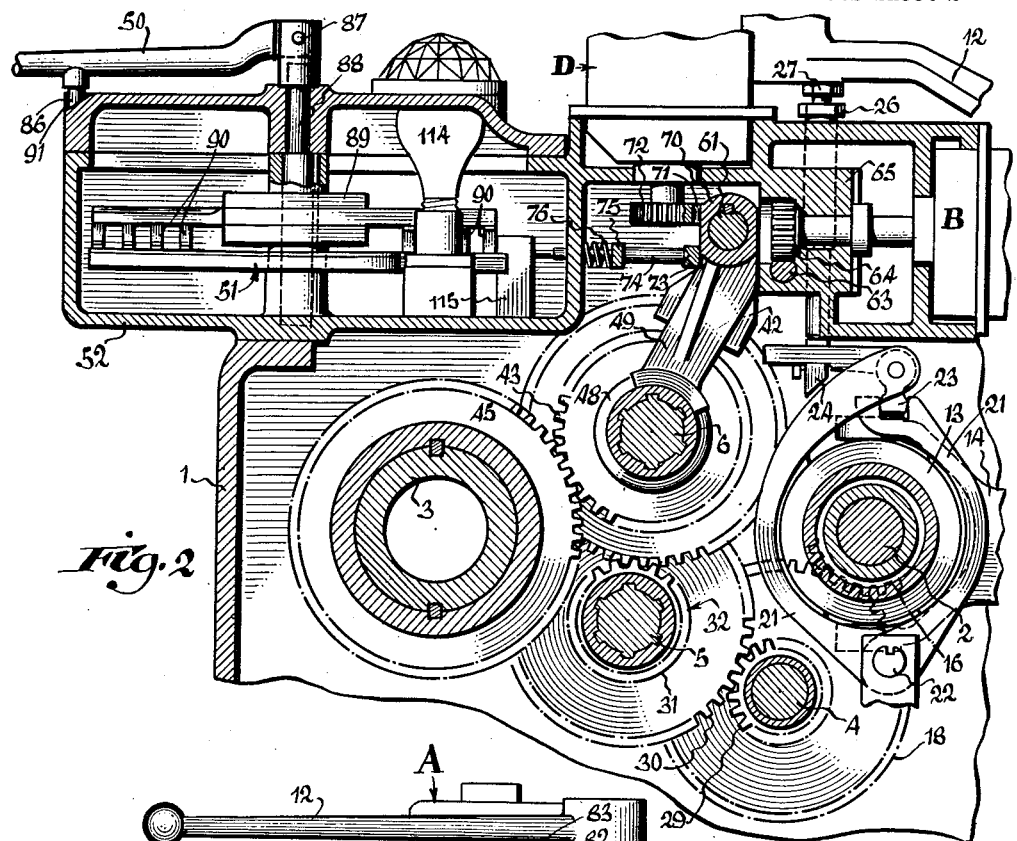
Figure 2 is a section on line 2—2, Figure 1.
Figure 4:
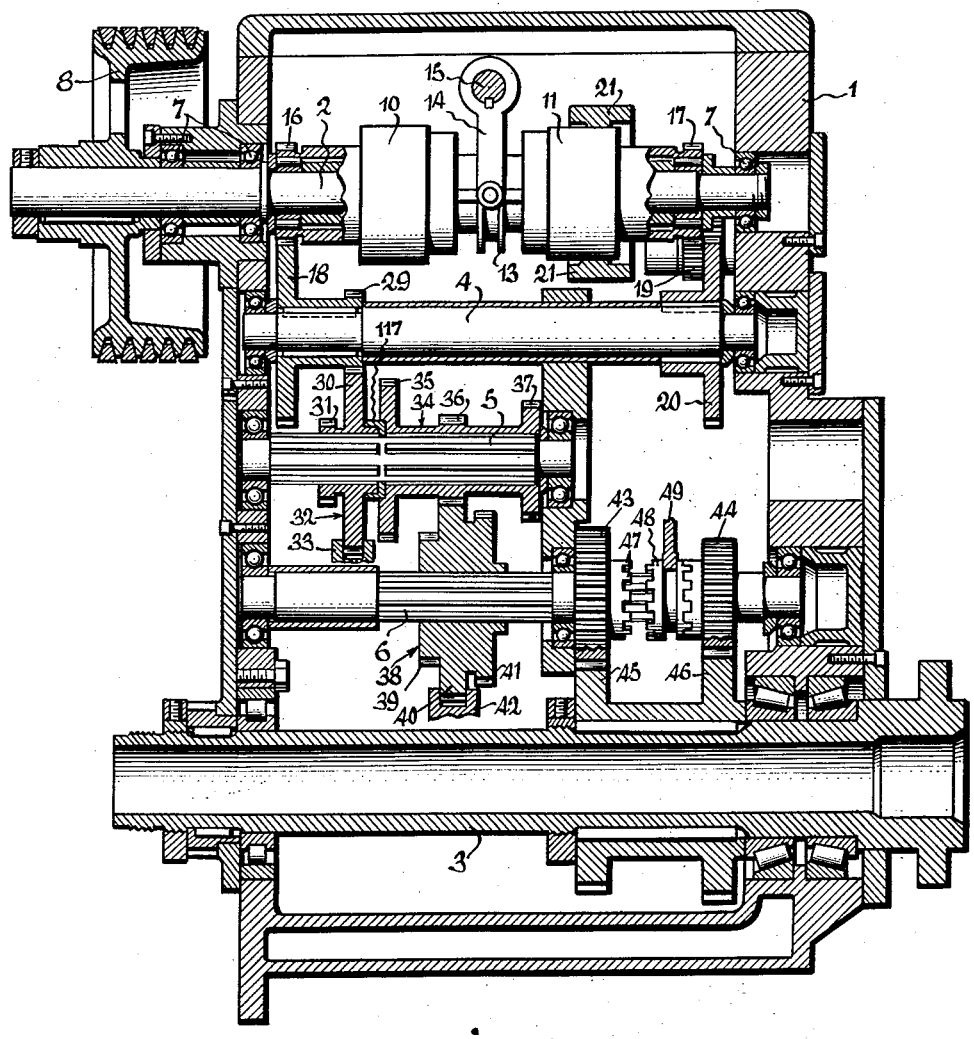
Figure 4 is a section taken on line 4—4, Figure 3, showing the transmission assembly with the gears in low speed position arranged in a common plane to facilitate illustration.
Figure 5:
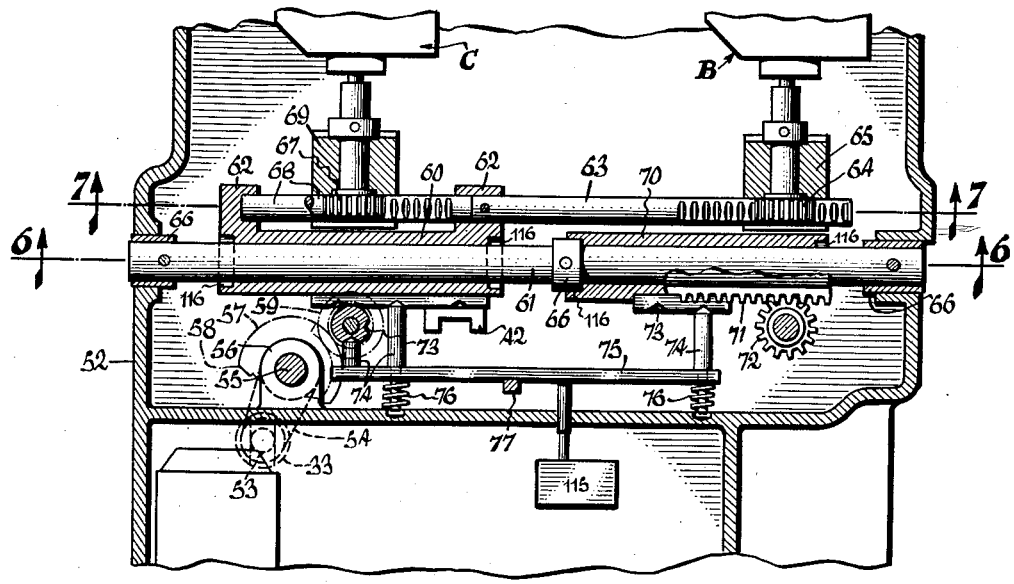
Figure 5 is a fragmentary sectional view similar to Figure 1, further illustrating the selector mechanism.

Three countershafts are interposed between the driving and driven shafts, each carrying a group of gears which are selectively brought into train between said driving and driven shafts to obtain the various speed ratios. As illustrated in Figure 2, the gear supporting shafts are compactly grouped within the casing for disposing the various gears in appropriate intermesh and train relationship with the shifter control mechanism located thereabove. In Figure 4 the various shafts are illustrated in a single plane for a more convenient disclosure.

Referring to the drawings, the transmission comprises a casing 1 having journalled therein a power or drive shaft 2 and a driven shaft or spindle 3. A system of three countershafts or intermediate shafts 4, 5, 6, is disposed between the drive and the driven shaft or spindle, and carry the intermediate gears of the speed change train of gears between the drive shaft 2 and driven shaft or spindle 3. The main drive or power shaft 2 is suitably journalled at opposite ends in ball bearings 7, and projects externally of the casing at one side thereof with a drive pulley 8 keyed thereon, and shown as peripherally grooved for a multi-belt drive.

The drive shaft 2 carries a pair of directional friction clutches 10 and 11, adjoiningly arranged for alternate operation by a main direction control lever 12. A shifter collar 13, disposed on the shaft 2 between the clutches 10, 11, for operating the clutches, is straddled by a yoke 14 secured to a control or rock shaft 15 of the main directional control lever 12. The control lever may be swung to one side or the other of a centralized neutral position for shifting the collar 13 in the appropriate direction to engage one or the other of the clutches.

The clutches, of conventional design, are loosely journalled on the shaft 2, and respectively are provided with pinions 16 and 17 formed on the hubs thereof and relatively disposed within and at opposite ends of the casing. The pinion 16 at the lefthand side meshes with a gear 18 as a member of a compound gear keyed to the countershaft 4, while the pinion 17 meshes with a reversing idler gear 19, which in turn meshes with a gear 20 keyed on the opposite end of the countershaft 4. When the direction control lever 12 is actuated, the appropriate clutch is frictionally engaged with the driven shaft 2 while the other clutch is free to idle in the opposite direction as driven by the countershaft 4.

The transmission unit is provided with a brake (see Figure 2) in the form of a pair of brake shoes 21, 21, disposed about the clutch 11 for a frictional engagement thereupon. The brake is of utility in quickly stopping rotation of the gears preparatory to making a speed change effecting a saving in time and preventing injury to the gear teeth by eliminating clashing.

The brake is operated by applying downward pressure on the direction control lever 12 when in a centralized, neutral, or clutch disengaged position. The brake shoes are pivotally supported at their lower ends on a shaft 22, and have their upper ends in engagement with a rocker arm 23 resting upon one end of a lever 24. The lever 24 is centrally pivoted on a stud 25, and its opposite end is engaged by a vertical plunger 26, the upper end of which includes an adjustment screw 27 in contact with the direction control lever 12. The lever 12 is pivotally mounted on the upper end of the control or rock shaft 15, as at 28, for vertical pivotal movement permitting the brake to be applied when the lever is depressed while stationed in its neutral position.

The transmission provides for twelve selective speed changes in either forward or reverse direction of rotation, being shown in Figure 4 in the low speed selection. On the countershaft 4 the gear 18 includes on its hub a pinion 29, the gears 18 and 29 meshing respectively alternately with relatively different diameter gears 30 and 31, as members of a compound gear 32 slidingly splined on the countershaft 5. The gears 30 and 31 as a unit are shifted by the two-position shifter fork 33 operated by the selector mechanism. Adjacent the gears 30 and 31, the countershaft 5 is provided with a cluster 34 of three spaced gears 35, 36, 37. The cluster is fixed axially on the shaft 5, and the gears are selectively engaged by relative members of a compound gear 38 consisting of gears 39, 40 and 41, as a unit splined and slidable upon the countershaft 6. The compound gear 38 is shifted by the three position shifter fork 42 operated by the selector mechanism to selectively mesh with one of the gears of the cluster 34.

Adjacent the compound gear 38, a pair of spaced gears 43 and 44, of relatively different diameters, is loosely journalled on the countershaft 6, the gears respectively in constant mesh with a set of gears 45 and 46 as members of a compound gear keyed to the spindle 3. The gears 43 and 44 are the end gears of a train between the drive shaft 2 and spindle 3. The respective hubs of the gears 43, 44, are provided with clutch teeth 47 for alternate engagement with a toothed clutch collar 48 disposed therebetween. The collar is slidingly splined on the shaft 6, and shifted by the two-position shifter yoke 49 operated by the selector mechanism to selectively clutch either the gear 43 or 44 completing the drive to the spindle.

The twelve speeds are in progressively increasing ratio: two speeds being attained by the slidable two-gear cluster or compound gear 32 on the countershaft 5, multiplied by the three-speed gear cluster 38 on countershaft 6, the six speeds then doubled at the spindle by the two-speed clutch collar 48, selectively coupling either the gear 43 or 44 driving the spindle gears 45 and 46. The successive gear shifts are effected by electrically operated means controlled by a manually operated selector lever 50 actuating a selector switch 51 to energize the appropriate shifter motor or motors.

Figures 1, 9:
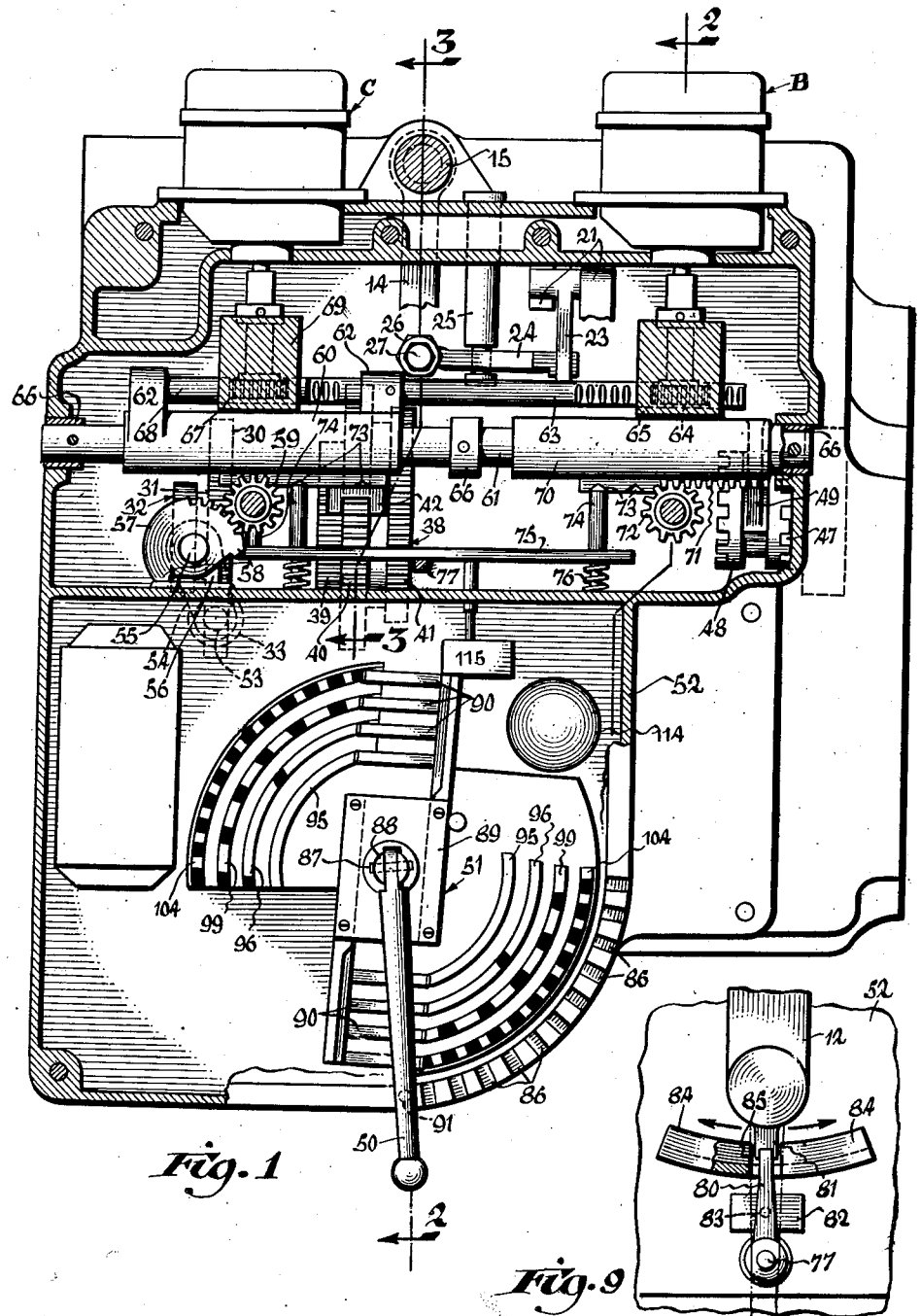
Figure 1 is a general horizontal sectional view of the speed selector and control apparatus of the improved change speed gear transmission, shown in the low speed position.
Figure 9 is a fragmentary top plan view illustrating the interlock for the main direction control lever, the selector interlock plunger, and electrical control switch associated therewith.
Figure 3:
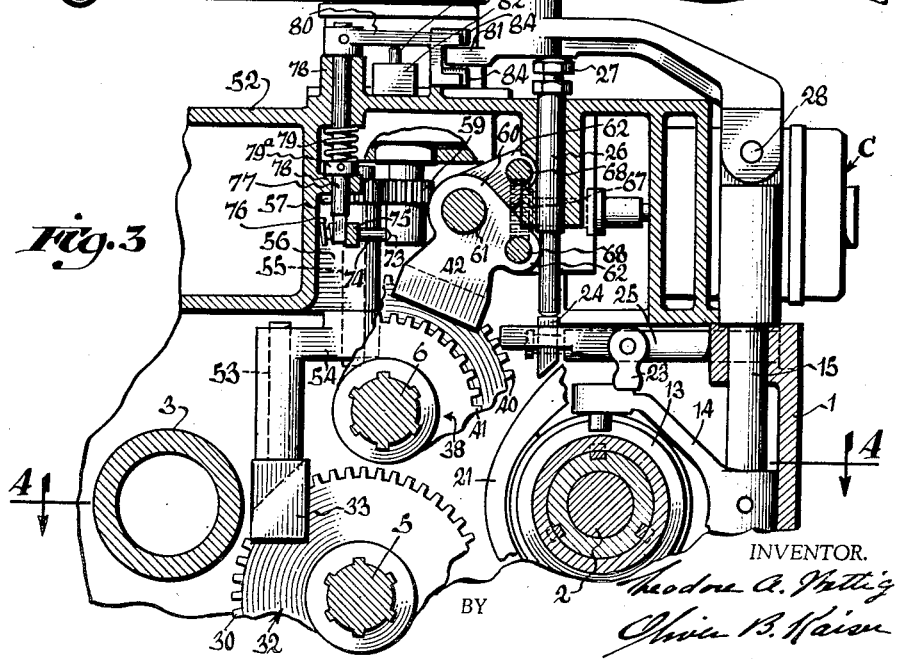
Figure 3 is a section taken on line 3—3, Figure 1.

The shifter mechanism is embodied in a casing 52 located at the top of the transmission casing 1, as shown in Figures 1, 2, and 3. The slidable compound gear 32 on the countershaft 5 is shifted to alternate positions by the shifter fork 33, which straddles the gear 30, the shifter fork being pivotally mounted on a shaft 53 carried by a crank 54 (Fig. 3). The crank is sustained on a rock shaft 55 (Fig. 1) journalled in a bracket 56 secured to the casing. To the upper end of the rock shaft is secured a segmental gear 57 providing a pair of stops 58 (Fig. 1) engageable with a flat surfaced lug on the inner side of the casing for limiting the movements of the segment and shifter fork. The teeth of the segmental gear 57 are in mesh with a gear 59, secured on the armature shaft of a reversible electric motor A. Operation of the motor in either direction swings the crank and shifter fork in an arc, to a degree limited by the stops 58, for respectively meshing the gears 30 and 31 with the gears 18 and 29 according to the direction of motor armature rotation.

Figure 6:
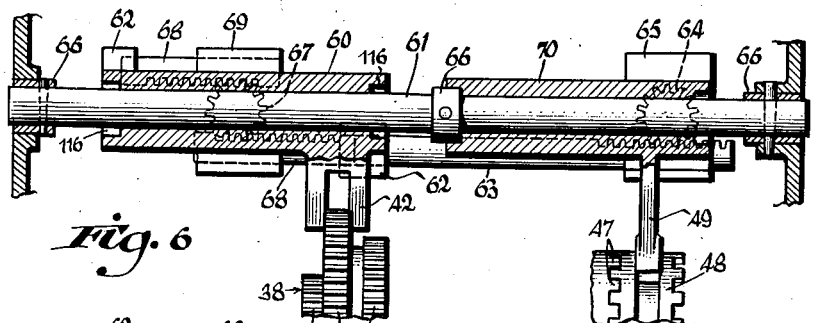
Figure 6 is a section on line 6—6, Figure 5.

The cluster gear 38 on shaft 6 is selectively shifted into one of three positions by the shifter fork 42 straddling the middle gear 40 of the series. The shifter fork 42 depends downwardly as part of a sleeve 60 (Figs. 1 and 10) axially slidable on a bar 61 having its opposite ends mounted in the casing. The sleeve 60 (Figs. 6 and 10) includes a pair of lugs 62, one of which is fixed to an end of a rack bar 63 for translating the sleeve. The rack bar 63 has rack teeth formed at one of its opposite ends in mesh with a pinion 64 on the armature shaft of a reversible electric motor B. The rack and pinion are enclosed and supported in meshing engagement within a block 65 formed as part of the selector casing. The motor B serves to shift the cluster gear 38 to its extreme right and left positions, to bring either the gear 39 or 41 into mesh with the respective companion gears 35 or 37. The rod 61 is provided with stops in the form of collars 66 to limit the right and left endwise shifting movement of the sleeve.

The gear cluster 38 is shifted to its centralized position to bring the middle gear 40 into meshing engagement with the companion gear 36 by the single direction electric motor C. The armature shaft of this motor carries a pinion 67 in mesh with a pair of opposed rack plungers 68 disposed at relative opposite sides of the pinion, to move in relative alternating directions, with the outer ends adapted to contact respectively with the lugs 62, 62. The racks and pinion are sustained in intermeshing relationship within a block 69 similar to the block 65, the plungers slidable in respective bores formed therethrough.

Figure 7:
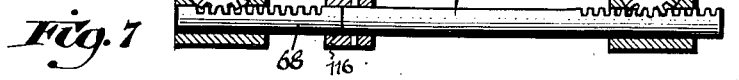
Figure 7 is a section on line 7—7, Figure 5.

The plungers 68, 68, being disposed on opposite sides of the pinion 67, move in opposite directions when the pinion is rotated. The lugs 62, 62, are projected in offset relationship axially of the sleeve 60 for engagement with an end of a relative rack plunger. When the motor C is energized, as shown in Figure 7, the rack plungers are propelled equally in respectively opposite directions outwardly to engage the lugs and centralize the sleeve, thus meshing the gear 40 on shaft 6 with its companion gear 36 on shaft 5. The electrical circuit is arranged so that the motors B and C cannot be energized simultaneously. Therefore, the motor B is free to rotate in accommodating the movements of the rack 63 when the shifter sleeve is centralized, and likewise the centralizing motor C is free to accommodate the movements of the rack when the motor B is energized in shifting.

The two-position shifter yoke 49 for the clutch collar 48 depends as a part of sleeve 70, slidingly sustained on the rod 61. The sleeve is provided with rack teeth 71 in mesh with a pinion 72 mounted on the armature shaft of a reversible electric motor D for shifting the clutch collar alternately in engagement with either the gear 43 or 44. Movement of the sleeve is limited by the stop collars 66 in the same manner as the sleeve 60.

Each of the shifter sleeves 60 and 70 and the hub of the gear 59 is provided with detent notches 73 for cooperation with respective spring urged detent plungers 74, serving to hold the selector mechanism in the several shifted positions. These notches are appropriately spaced, permitting the detent plungers to engage the notches when the gears are meshed with their appropriate companion gears. The two-position shifter sleeve 70 and the shifter crank 54 are provided with two notches, while the three-position shifter sleeve 60 is provided with three notches, one for each gear position.

The detent plungers are mounted upon a detent bar 75, a pair of compression springs 76 being disposed between the bar and the casing to urge the plungers into latching engagement with the notches when the gears are meshed.

A lock plunger 77, vertically slidable within a pair of lugs 78 of the casing, has its lower end disposed in latching engagement against the detent bar, serving to lock the bar and detent plungers in latching engagement with the respective notches. The plunger positively locks the shifter mechanism in position, preventing any accidental displacement or shifting of the gears. The plunger remains in its locking position until released by the power controlling lever 12 to which it connects, upon elevating the lever. A compression spring 79 normally exerts a downward pressure against a collar 79ª secured on the plunger to hold the same in position behind the detent bar. An arm 80 is secured to the upper end of the plunger externally of the casing. The opposite end of the arm is bifurcated for cooperation with a lug 81 as part of the main direction control lever 12.

Shifting of the gears, after a selection has been made with the selector lever, is instituted by centralizing the main control lever, then swinging the same vertically. This movement elevates the lug carrying with it the arm 80 and lifting the latching plunger out of engagement with the detent bar. Upward movement of the arm also closes an electrical control switch 82 (Figure 3), the switch having a spring pressed plunger 83 bearing against the under side of the arm, normally holding the contacts open. Closing of the switch completes a circuit to the shifter motors instituting the speed change gear shift.

The direction control lever 12 is free to swing vertically only in its centralized or clutch release position, so that the contact switch 83 can not be closed when either of the direction clutches are engaged. The cover of the selector casing is provided with a pair of spaced channel guard sections 84, 84, for receiving and confining the lug 81 projecting from the control lever 12 to prevent vertical swing of the control lever when shifted either to the right or left of its central or neutral position in effecting a driving control of one of the transmission clutches.

The spacing 85 of the guard sections provides a clearance for the lug 81 to permit the control lever 12 when in the central or neutral position to be shifted vertically, and to bring the lug 81 into registry with the forked end of the latch plunger arm 80 which projects into said spacing. Upon depressing the lever 12 while in its neutral position below the lug alignment with the channel of the guard sections 84, it will actuate and apply the brake, and upon elevating the same to bring the lug above an aligning position with the channel of the guard sections, the lug will contact and actuate the latch plunger to close the contacts of the switch 82 for a speed change operation. The lever is manually held in its elevated position for a period to effect a speed change operation, whereupon, it is again neutralized and moved either to the right or left for throwing in a transmission clutch.

The speeds are selected by swinging the selector lever 50 relative to a series of notches 86, twelve in number, corresponding to the speed changes. The selector lever is pivoted as at 87 to the upper end of a shaft 88, to which is secured a switch rotor 89 including a series of brushes 90 for contact with a series of circuit-controlling stationary contacts. The selector lever is provided with a pin 91 on its under side for engaging the notches, and swings vertically on its pivot for lowering the same into engagement with the selected notch.

Figure 10:
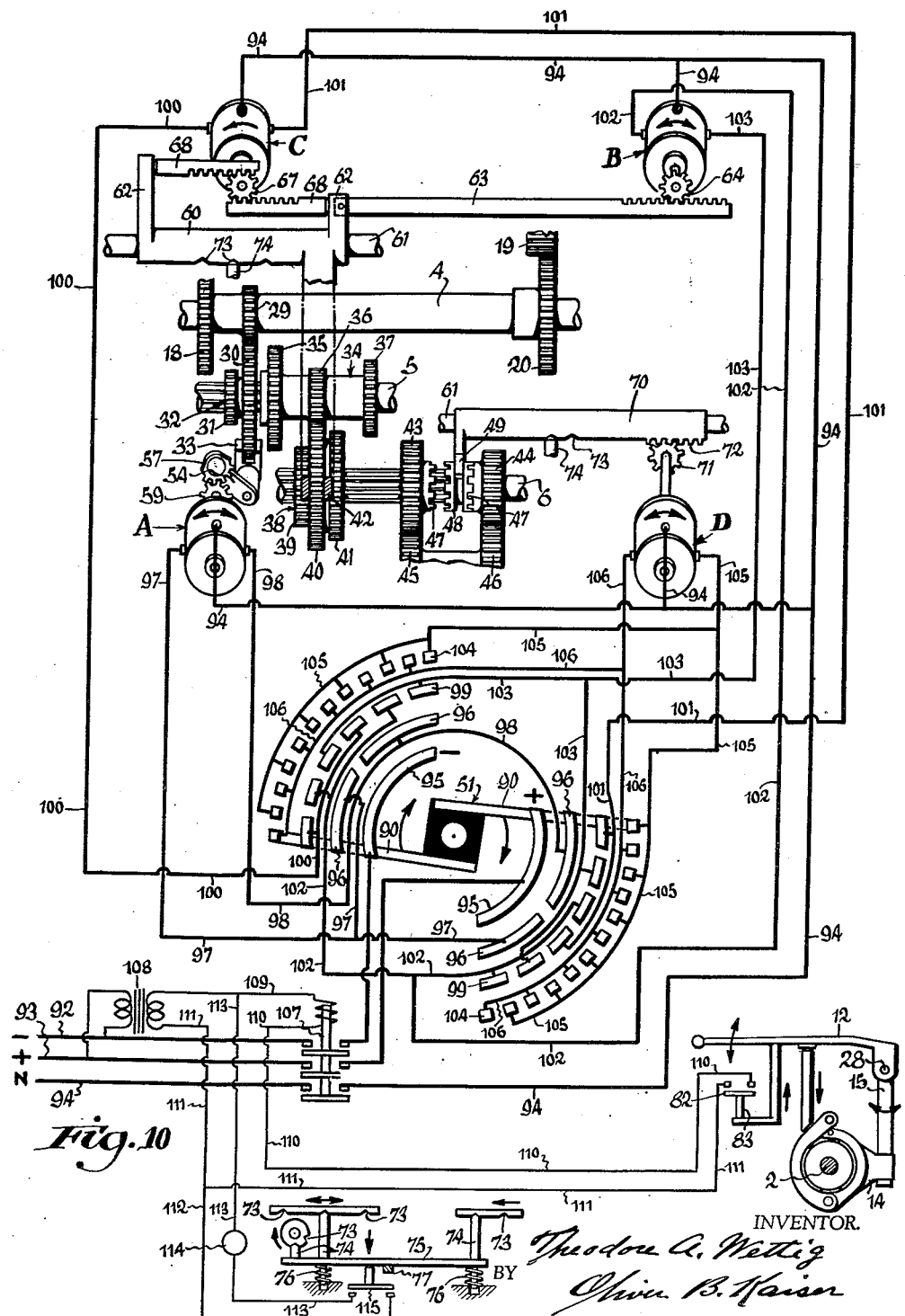
Figure 10 is a diagrammatic view illustrating the electrical circuit with the selector and transmission mechanism associated therewith.

The apparatus is of a pre-selector type, permitting a selection or speed change to be initiated while the machine is in operation, the speed change being completed when the main power or drive controlling lever 12 is actuated to its clutch disengagement and braking position, then elevated to close the selector electric circuit and release the detent or lock bar. In the present instance, as shown in Figure 10, the electrical apparatus operates on a three-phase alternating circuit, the electric motors for gear or clutch shifting with the exception of the centralizing motor C, being reversible. The current is supplied by the feed lines 92, 93, 94, the line 94 being common to all four motors. Lines 92 and 93 are connected to the arcuate feeder contacts 95, serving to energize the brushes 90 for directing the current to the appropriate shifter motor or motors. For purposes of illustration, the right and left switch contacts will be regarded as positive and negative respectively, while the third or common motor line 94 will be regarded as neutral, leading directly to the neutral pole of the several gear or clutch shifting motors.

Stationary contacts 96—96, in duplicate for opposite sides of the switch, are relatively connected to the positive and negative poles of motor A. In the switch position shown in diagram Figure 10, the circuit to the motor A is completed by the line 97, connecting with a contact 96 on either side of the axis of the switch, and by a line 98 likewise connecting with a contact 96 on either side of the axis of the switch.

Upon energizing the motor A, the gear 30 is shifted into mesh with the low speed companion gear 29, or gear 31 with gear 18, depending on the direction of motor rotation, so that in the one instance the shiftable compound gear 32 is moved to the right to bring gears 30 and 29 into intermesh and alternately to the left to bring gears 31 and 18 into intermesh. The two contacts 96 on one side of the axis of the switch connect the feed circuit to relative opposite poles of the motor which correspondingly follows for the two stationary contacts 96 at the opposite side of the axis of the switch. Therefore, one set of diametrically opposed contacts 95 combine for rotating the motor in a forward direction, while the other two relatively diametrically opposing contacts 96 are effective for a reversing control of the motor circuit.

When the control lever is in an extreme limit of its movement to bring the brushes 90 to the position shown in Figure 10, the motor A is energized to move in a direction to engage gear 30 with gear 29. The motor A is always energized during any gear shifting period, although it may be ineffective for shifting the compound gear 32 should it occupy the proper position for the given speed change. This insures holding the compound gear in position during a speed change operation while other gears of the system are being moved or shifted.

A second concentric series of motor contacts 99 are in duplicate for the opposite sides or axis of the switch, each series including six stationary contacts, and for each side or series are in a consecutive order to control the centralizing motor C and the reversible motor B. Two contacts of a series are in connection with the motor C, while four contacts of the series are in connection with the motor B; two of which are utilized for a control of the motor B in one direction, and two for a control of the motor in an opposite direction. The motor C when active always rotates in one direction. The motor C connects with a pair of contacts of one of the series of contacts 99 at one side of the axis of the switch by lines 100 and 101, the lines 100 and 101 leading to relatively opposite poles of the motor. The motor B connects with a pair of forward stationary contacts 99 and a pair of reversing contacts 99 relatively arranged in a consecutive order for each side of the axis of the switch, the contacts connecting by lines 102 and 103 respectively to the opposite sides or poles of the motor B.

A shown in Figure 10, the second and fifth contacts, from the position of the switch lever as shown in said figure, connect with line 103, while the third and sixth stationary contacts connect with line 102. Thus the first of a series connects with the motor C, the second with the motor B for one direction, and the third with the motor B for a reversing direction. The same order follows for the next three successive contacts of the series. In the switch position shown in Figure 10, the reversible motor B is not energized, and the centralizing motor C is energized, for meshing gear 40 of the cluster gear 38 with the low speed companion gear 36.

The third series of motor contacts 104, also in duplicate for opposite sides of the switch, connect through the lines 105 and 106 with the positive and negative poles of the reversible motor D for shifting the clutch collar 48 alternately in engagement with one or the other of the gears 43 and 44. In the switch position shown, the motor is energized in the direction for shifting the collar to the right into driving engagement with the low speed gear 44 of the spindle drive.

According to the circuit shown, the clutch collar 48 is shifted for each speed change in a step by step movement of the control lever 50, the motor D being provided with a switch contact for each of the twelve speeds, the contacts arranged for motor shifting in alternate directions. When the selector lever is moved to the second position, the collar 48 is shifted to the left to engage the larger gear 43, thus increasing the spindle speed while the other gears of the train remain undisturbed.

When the third speed is selected, the clutch collar 48 is shifted to the right and contact is made with a contact 99 as the second of the series for reversible motor B, the brushes leaving the contact 99 as the first of the series for the centralizing motor C. Motor B is energized in the direction for shifting the cluster gear 38 to the right, meshing the gear 41 with the component gear 37 for an increase in speed.

For the fourth speed, the fourth contact 104 of the series is energized to shift the clutch collar 48 to the left for an increase in spindle speed, while the rest of the gear train remains as previously shifted.

When the fifth contact is energized for the fifth speed change, the clutch collar 48 shifts to the right, and a contact 99 of reversible motor B is energized to shift the cluster gear 38 left, meshing gear 39 with the component gear 35 for a speed increase.

The sixth contact increases the previously attained speed by shifting the clutch collar 48 to the left without disturbing the other gears.

When the seventh speed is selected, the brushes reach a second contact 98 for motor A to reverse the motor and shift the gear cluster 32 left to mesh gear 31 with component gear 18. At this point another contact 99 for centralizing motor C is reached, energizing the motor C to centralize the gear cluster 38 with the reversible motor B deenergized. Also, a contact 104 for a motor D is energized to shift the clutch collar to the right.

The remaining five speed changes are effected by a repeat of the sequence of gear changes as described for the first six speeds, the motor contacts being arranged to duplicate the action. Therefore, when the eighth contact is energized, the clutch collar 48 will shift left for a speed increase.

For the ninth speed, the clutch collar will shift right and motor B will be energized to shift cluster gear 38 right for a speed increase.

The tenth increase is effected by shifting the clutch collar 48 left without disturbing the other gears.

For the eleventh speed, the motor B is energized to shift the cluster 36 left to mesh gear 39 with component gear 35, and the clutch collar right.

The twelfth speed change is attained by energizing motor D to shift the clutch collar 48 left.

In making a speed selection, the selector lever 50 is swung to the appropriate notch, regardless as to whether the machine is running or not, as the selector motor circuit is normally deenergized. No speed change occurs until the main directional control lever 12 is actuated to disengage the clutches 10 and 11 and close the circuit. With the lever centralized, it may be elevated to close contacts of switch 82 initiating the gear shift. The switch 82 energizes a control circuit to close a relay switch 107, which controls the selector motor circuit.

The control circuit operates on low voltage, preferably of single phase, supplied by a step-down transformer 108 connected across two of the three phase mains. One side of the secondary transformer winding is in connection with the coil of relay switch 107 by a wire 109, and the other side of the relay coil connects through the normally open lever controlled switch 82 to the other side of the transformer winding by the wires 110 and 111. When the directional power control lever is elevated, the circuit to the relay is completed, this closing the selector motor circuit to shift the gears.

A pair of branch lines 112, 113, are also connected to the transformer for operating a signal lamp 114 in series in the circuit. The lamp is controlled by a normally open switch 115 having its contacts serially in the line 113, the switch having a plunger in contact with the detent bar 75 operable to close the circuit and light the lamp during shifting of the gears. When any one of the shifter motors is energized, the detent bar is moved rearwardly by disengagement of the detent notches with respect to the plungers, thus lighting the lamp during shifting. In making a speed selection, it is necessary to keep the direction lever 12 elevated until the shift is complete, as indicated when the signal lamp is extinguished. When this occurs, the shift is completed and the machine ready for operation by swinging the control lever 12 into clutch engaging position.

The apparatus permits a pre-selection of any one of the twelve speeds at any time while the machine is in operation. In most machine tool operations, this is of particular utility, enabling the operator preliminarily to select the proper speed for a succeeding operation. For example, in turning work of several diameters on a lathe, the proper speed for turning a given diameter may be pre-selected while the machine is set up and operating on a different diameter.

If desired, the selector may include an indicating table adjacent the selector lever for designating the turning speed and lever position for various materials and diameters, as a guide in selecting the correct speed.

The shifting movements of the selector mechanism are oil cushioned by the provision of cylindrical recesses 116 at opposite ends of the shifter sleeves 60 and 70. The recesses act as dash pots and cooperate with the stop collars 66 of the slide shaft 61, entrapping a quantity of the transmission lubricant when the end of the sleeve meets the stop collar. The lubricant escapes gradually under pressure of the sleeve, and thus brings the same to a gradual stop to eliminate shocks. The lugs 62 of the centralizing sleeve are likewise recessed to cooperate with the ends of the centralizing plungers for cushioning the same. A cup 117 fixed to the countershaft 5 forms a cushion in cooperation with the hub of gear 30 since the selector crank for this gear is not provided with cushioning means.

In the arrangement disclosed, the two gear compound 32 and the gear train controlling clutch 48 having two alternate active positions, the shift in each instance is made by a single motor of reversing type, while the three gear compound is operated by two electric motors, one driving in a single direction for moving the compound gear to a central position, and the second motor of reversing type for moving the compound gear to either of its alternate extreme positions. In each instance the motors are stalled by the rack bar at the end of a throw coming in contact with a rigid stop, the motors being of a type to withstand such strain without injury, particularly as the energizing period is comparatively brief.

Figure 8:
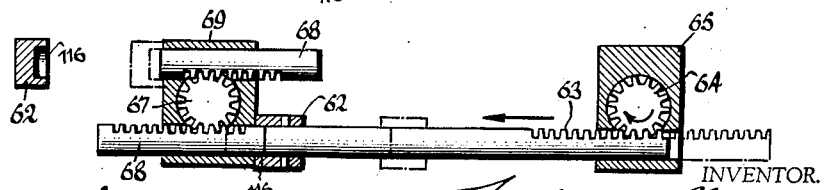
Figure 8 is a view similar to Figure 7, showing the mechanism in shifted position.

The motor B for the three gear compound moves the shifter sleeve 60 to either of its limits of throw against the stops 66 between which it slides on the rod 61. In moving the shifter sleeve 60 from its central position, as shown in Figure 10, say to the left, as shown in Figure 8, the rack bar 63 actuates the rack bar 68 in axial alignment therewith, which in turn rotates the pinion 67 on the armature shaft of the motor C, the motor C being not energized, consequently moving the second rack bar 68 in a reverse direction. Should the rack bar 63 be moved in the alternate direction to the right, the second or upper rack bar 68 then becomes the driver and moves with the rack bar 63 to the right by reason of its engagement with the adjoining arm 62 of the rack sleeve 60, moving the first rack bar 68 through the motor pinion 67 to the left.

In the event that motor C is energized, it would move both rack bars 68 in relative opposite directions, and as one end thereof is in contact with a projecting arm 62 of the shifter sleeve 60, it will move the shifter sleeve in the appropriate direction and at the same time move the other rack bar 68 in an opposite direction until it contacts with its adjacent arm 62 of the shifter sleeve 60. When both rack bars 68 are in abutting contact with the arms of the sleeve 60, further movement thereof is arrested, thereby stalling the motor C, with the shifter sleeve and compound gear 38 in the central position and the gear 40 thereof in mesh with the gear 36.

The circuit control for the several motors causes an energization of the motors A and D for each speed change or switch step position, and although they may not be effected for actuating the shifter bar or sleeve by reason of being in the proper limit of movement, this serves to hold the gears in position. The motors C and B are alternately energized, and likewise if the selected gear under their control is in proper position by reason of a prior speed change shift, the energizing of the motors will be ineffective except to hold the respective gears in position.

Having described my invention, I claim:

1. A speed change transmission including driving means and control means therefor, a plurality of shiftable speed change gears, the gears serially disposed in train relationship and shiftable individually for effecting a speed change setting, a plurality of electric motor driven shifter means associated with respective speed change gears, a selector switch having a series of contacts for a circuit control of the motors of one or a plurality of the shifter means either in a forward or reverse direction to shift one or a combination of the speed change gears for a variation of speed, a manually operated selector lever connected to the switch for administering a speed change setting, and means operative through a driving power control lever for controlling the circuit to effect a change in speed when the transmission is at rest.

2. A speed change transmission, comprising: a drive shaft and a driven shaft, a gear train, comprising: a plurality of speed change gears and companion gears connecting said shaft, the speed change gears adapted for selective intermesh with respective companion gears for a series of speed changes, a plurality of electric motors, each having shifter means associated with respective speed change gears for shifting the same, a manually actuated selector switch electrically connected to the respective motors, a manually operated control lever to control rotation of the drive shaft, and an electric switch actuated by the control lever operable to supply electric current to the selector switch to effect a speed change when the control lever is in neutral position.

3. A speed change transmission, comprising: a drive shaft and a driven shaft, a gear train of a plurality of speed change gears and companion gears connecting said shafts, the speed change gears adapted for selective intermesh with respective companion gears for a series of speed changes, a pair of clutches on said drive shaft operable to drive the same either in forward or reverse direction, a manually operated clutch control lever connected to said clutches for alternate engagement thereof, a plurality of electric motors, each having shifter means associated with respective speed change gears for selectively shifting the same, a manually actuated selector switch electrically connected to the respective motors, and an electric switch actuated by said clutch control lever operable to supply electric current to the selector switch to effect a speed change when the control lever is in a neutral position.

4. In a speed change transmission, a drive shaft and a driven shaft, a gear train, comprising: a plurality of speed change gears and companion gears connecting said shafts, the speed change gears adapted for selective intermesh with respective companion gears for a series of speed changes, a pair of clutches on said drive shaft operable to drive the train either in forward or reverse direction, a manually operated clutch control lever connected to said clutches for alternate engagement thereof, a plurality of electric motors, each having shifter means associated with respective speed change gears for selectively shifting the same, a manually actuated selector switch electrically connected to the respective motors, an electric switch associated with the clutch lever operable to supply electric current to the selector switch to effect a speed change when the control lever is in a neutral position, and an interlock associated with the clutch control lever operable to normally lock the speed change gears in non-shiftable position and to unlock the same when the control lever is in neutral position.

5. In a speed change transmission, a driving shaft and a driven shaft, a plurality of gear trains for connecting said driving and driven shafts including a multi-member compound gear having a member respectively for each of the trains and slidable for bringing a member thereof into train and the others thereof out of train, a reversible electric motor in transmitting connection with said compound gear for sliding the same in alternate directions for bringing one of two of its members into intermesh with a companion gear of a train, and a second electric motor adaptable for transmitting connection with said compound gear for sliding the same to an intermediate position for bringing an intermediate member thereof into intermesh with a companion gear of a relative train.

6. In a speed change transmission, a driving shaft and a driven shaft, a plurality of gear trains for connecting said driving and driven shafts including a multi-member compound gear having a member respectively for each of the trains and slidable for bringing a member thereof into train and the others thereof out of train, a reversible electric motor in transmitting connection with said compound gear for sliding the same in alternate directions for bringing one of two of its members into intermesh with a companion gear of a relative gear train, and a second electric motor adapted for transmitting connection with said compound gear for sliding the same to an intermediate position for bringing an intermediate member thereof into intermesh with a companion gear of a relative train, and an electric selector switch for separately energizing said motors.

7. In a speed change transmission, a driving shaft and a driven shaft, a plurality of gear trains including a unitary three member speed change gear, the speed change gear slidable for selectively shifting a respective gear member into mesh with a companion gear of a relative gear train, a reversible electric motor having shifter means connected with the speed change gear for alternately shifting the same to endwise limits for meshing either of two end gear members of the speed change gear with a relative companion gear of a train, a second electric motor transmitting a driving pinion, a pair of racks in mesh at respective opposite sides of the pinion for movement in opposite directions, and a pair of spaced elements on said shifter means for engagement by the respective racks to centralize the shifter means when the second motor is energized, and mesh a respective intermediate gear member of the speed change gear with a companion gear of a relative gear train for a third speed change.

8. In a speed change transmission, a driving shaft and a driven shaft, a plurality of gear trains for connecting said driving and driven shafts including a multi-member compound gear having a member respectively for each of the trains and slidable for bringing a member thereof into train and the others thereof out of train, a reversible electric motor for sliding said compound gear to the limits of either of alternate directions, a slidable shifter connecting with said compound gear and a rack and pinion connection with the armature shaft of the motor for bringing either of the opposite end members of said compound gear into or out of relative gear trains, a second electric motor for sliding said shifter to bring an intermediate member of the compound gear into a relative gear train, a pinion positively rotated in one direction by said second motor and a pair of racks in intermesh with said pinion at opposite sides thereof for opposite translation of the racks and adapted for effecting connection with said shifter, whereby the translation of the shifter by said first motor idly translates said pair of racks through a contact connection of one of them with the shifter to render the same effective for moving the shifter to an intermediate position when the second motor is energized and withhold rotation of said second motor when said compound gear is stationed in an effective intermediate position.

9. A speed change transmission, comprising: a transmission unit having a drive shaft and a driven shaft, a plurality of shiftable speed change gears connecting the shafts, means for shifting the gears, a pair of clutches on the drive shaft operable to drive the gears either in a forward or reverse direction, a clutch control lever to engage either of said clutches having a neutral clutch disengaged position, a brake for said transmission, and means associated with the clutch control lever operable to apply the brake when the lever is in neutral clutch disengaged position.

10. A speed change transmission, comprising: a transmission unit having a drive shaft and a driven shaft, a plurality of trains of gears connecting the shafts to transmit the driven shaft at various speeds in either of reverse directions, a pair of clutches on the drive shaft operable to connect the shaft with either of the forward or reverse direction gear trains, a clutch control lever to engage either of said clutches and having a neutral clutch disengaged position, a brake for said transmission, means associated with the clutch control lever to apply the brake when the lever is in neutral position, electrically operated shifter for selectively bringing a gear of a train into and out of train to effect a speed change, and means associated with the clutch control lever to electrically energize the shifter means for effecting a speed change when the clutch control lever is in neutral position.

11. In a speed change gear transmission, a driving shaft, a driven shaft, a plurality of trains of gears for connecting said shafts, each train having one or more members translatable alternately into and out of train, an electric motor for each translatable member in operative connection therewith, a motor energizing, reversing and speed change indexing electric switch for an individual and selective control of the motors having a definite pre-setting position for each speed change, and a drive control clutch having a manually operable control lever and effective for closing an electric circuit to said switch and motors when occupying a neutral position.

12. In a speed change gear transmission, a driving shaft, a driven shaft, a plurality of trains of gears for connecting said shafts, each train having one or more members translatable alternately into and out of train, an electric motor for each translatable member in operative connection therewith, a motor energizing, reversing and speed change indexing electric switch for an individual and selective control of the motors having a definite pre-setting position for each speed change, a drive control clutch having a manually operable control lever and effective for controlling an electric circuit to said switch and motors when occupying a neutral position, a mechanically operated brake for withholding gear rotation when said drive control lever is in neutral position, the lever actuating the brake upon movement of the lever in a direction counter to the electric circuit control for said switch and motors, and a visible signal indicating the completeness of the action.

THEODORE A. WETTIG.